United States Patent [19]
de Crevoisier et al.

[11] 3,884,654
[45] May 20, 1975

[54] DEVICES FOR FORMING A HOMOGENEOUS SHEET OF A FLOWING SUBSTANCE

[75] Inventors: Philippe de Crevoisier, Nancy; John George Stockholm, Pont-a-Mousson, both of France

[73] Assignee: Tunzini-Ameliorair, Paris, France

[22] Filed: Jan. 17, 1972

[21] Appl. No.: 218,186

[30] Foreign Application Priority Data
Feb. 3, 1971 France .................. 71.03650
Apr. 26, 1971 France .................. 71.14834
May 26, 1971 France .................. 71.19056

[52] U.S. Cl. ............ 55/225; 55/226; 55/240; 55/242; 55/245; 55/257; 261/62; 261/112; 261/118; 261/DIG. 54; 98/115 SB
[51] Int. Cl. ........................................... B01d 47/02
[58] Field of Search ....... 98/115 SB, 115 K; 55/226, 55/240, 242, 244, 459, 245, 227, 257, 258, 259, 225, 227, 246; 261/112, 108, DIG. 54, 114 R, 118, 116, 117, 62, 119 R, 119, 110; 165/112, 113

[56] References Cited
UNITED STATES PATENTS

| | | | |
|---|---|---|---|
| 1,073,621 | 9/1913 | Murray | 261/112 |
| 2,883,170 | 4/1959 | Trittipoe | 261/119 R |
| 3,018,847 | 1/1962 | Stanly | 261/112 X |
| 3,130,024 | 4/1964 | Vaughan, Jr. | 261/119 R |
| 3,131,237 | 4/1964 | Collins, Jr. | 261/119 R |
| 3,138,442 | 6/1964 | Krantz | 55/227 |
| 3,195,515 | 7/1965 | Blizard | 55/459 X |
| 3,321,191 | 5/1967 | Najarian | 261/110 X |

FOREIGN PATENTS OR APPLICATIONS

| | | | |
|---|---|---|---|
| 99,644 | 6/1961 | Netherlands | 55/257 |
| 197,095 | 10/1964 | Sweden | 261/DIG. 54 |
| 197,096 | 12/1964 | Sweden | 261/DIG. 54 |
| 723,849 | 2/1955 | United Kingdom | 261/8 |

*Primary Examiner*—Frank W. Lutter
*Assistant Examiner*—Neil F. Greenblum
*Attorney, Agent, or Firm*—Larson, Taylor & Hinds

[57] ABSTRACT

The device has at least one inclined trickling wall having a wet side and a dry side and means to cause the flowing substance to trickle over the wet side of this trickling wall. At least one complementary wall is constituted by a lower portion extending transversely beyond the extension of the wet side of the trickling wall and bounding with the lower edge of the trickling wall a separating slot. An upper portion extends upwardly from the dry side of the trickling wall and bounds with this dry side a reserve volume upwardly open and in communication with a zone of the device under suction with respect to the zone situated at the level of the lower edge of the trickling wall. The device is useful for washing a polluted gas such as air charged with paint fog from a painting enclosure or in coating machines.

27 Claims, 17 Drawing Figures

DEVICES FOR FORMING A HOMOGENEOUS SHEET OF A FLOWING SUBSTANCE

The invention relates to devices for producing a homogeneous sheet of a flowing substance. By "flowing substance" is meant a substance capable of trickling over an inclined wall; such a substance can be a liquid substance or a pulverulent substance.

Hitherto, devices of this type included at least one inclined wall, called "trickling wall," and means for making the substance concerned trickle over one side of this trickling wall called "wet side."

In such a device, the substance which trickles over the wet side of the trickling wall is detached from the lower edge of the trickling wall to form a sheet which can be used for various purposes.

Whatever the use of this sheet, it is important that it should have a homogeneous character, that is to say that it be free of tearing.

It is an object of the invention to fill in possible tears which can be produced in the sheet of substance in the course of trickling over the wet side of the trickling wall.

According to the invention, the device comprises at least one inclined trickling wall having a wet side and a dry side, and means for making the flowing substance trickle over the wet side of this trickling wall, and it is characterised by the fact that it comprises in addition at least one complementary wall constituted by, on one hand, a lower portion extending transversely beyond the extension of the wet side of the trickling wall and bounding with the lower edge of the trickling wall and a separating slot, and, on the other hand, an upper portion extending upwardly from the dry side of the trickling wall and bounding with this dry side a reserve volume open upwardly and placed in communication with a zone of the device under suction with respect to the zone situated at the level of the lower edge of the trickling wall.

It will then be seen that the flowing substance penetrates and accumulates in the reserve volume by reason of the difference between the pressure which exists in the zone situated at the level of the lower edge of the trickling wall and the pressure which exists in the said reserve volume.

Due to the flowing substance accumulated in this reserve volume, any tearing of the sheet on the wet side of the trickling wall is filled in by an addition of flowing product coming from the abovesaid reserve volume.

The invention relates more particularly, because it is in this case that this application seems to be of most advantage, to devices for producing a homogeneous sheet of washing liquid for a polluted gas, especially a polluted gas containing solid and/or liquid particles in suspension which must be caught by the washing liquid.

In this field of application, there should also be mentioned the advantage of the invention in the washing of air polluted by a fog of paint or by pigments, pulverulent or not, that is to say by fine droplets or particles in suspension. Such polluted air is to be found extracted from enclosures in which the painting of parts by spraying with a gun or by any other method is carried out.

The device according to the invention is then completed by means to make the polluted gas flow over the wet side of the trickling wall, these means being arranged to make the polluted gas flow in the same direction as the direction of trickling of the washing liquid, or in the reverse direction.

In a device of this type, the sheet formed by the washing liquid is detached from the lower edge of the trickling wall and is projected into the polluted gas in order to be sprayed and to obtain a mechanical and/or chemical effect of capturing or trapping the one or more materials polluting the said gas.

The efficiency of this trapping effect depends then on the homogeneity of spraying, which itself depends on the continuous character of the layer of washing liquid, and it is evident that any tearing in this layer, especially towards the lower edge of the trickling wall, disturbs the spraying of washing liquid locally and reduces the efficiency of the trapping effect.

Now, in such an application, the causes of tearing of the sheet of washing liquid are numerous and there may be mentioned among these causes: modification of the surface tension on the wet side of the trickling wall (greasy zones for example), deposit and agglomeration of particles on the wet side of the trickling wall (such as a conglutination of paint if it relates to air polluted by a fog of paint which is extracted from a painting enclosure, this conglutination being able to arise from drops falling to the floor of the enclosure, or through the action of an operator purging his gun by orienting it downwardly), an irregularity in the surface on the wet side of the trickling wall (joint in two plates, deformation due to shock, for example).

It should be pointed out with regard to this important application of the invention that the flow of polluted gas undergoes a pressure loss at the level of the lower edge of the trickling wall and that it is then particularly advantageous to place the reserve volume in communication with a zone of the device situated downstream of the lower edge of the trickling wall with respect to the flow of polluted gas. In fact, this zone situated downstream is under suction with respect to the zone situated at the level of the lower edge of the trickling wall.

According to a complementary feature of the invention, more especially relating to its application to the washing of a polluted gas, there is provided in addition a transverse wall arranged above the separating slot and extending from the trickling wall towards the complementary wall so as to bound, with the said complementary wall, a section of passage through which the liquid contained in the reserve volume can flow, and with the said trickling wall, a dead volume in which gaseous bubbles which are formed at the level of the separating can be temporarily retained.

It will then be seen that the level of the washing liquid is stabilized in the reserve volume by avoiding the production of a succession of gas bubbles between the separating slot and the surface of the liquid contained in the reserve volume; there is thus eliminated the risk of having communication established (in the form of a gaseous chimney) in the midst of the liquid contained in the reserve capacity, which communication would prevent the said reserve volume from providing an addition of liquid to fill in a possible tearing of the sheet on the wet side of the trickling wall.

According to another feature of the invention, relating to its application to the washing of a polluted gas, the device comprises at least two trickling walls which are each provided with their respective complementary walls then which are arranged so that their wet sides are facing one another, and so that one of these trickling walls is extended lower than the other, a deflecting wall being arranged facing the lower edge of the trickling wall which is most downwardly extended, and a stop surface being arranged below the lower edge of the deflecting wall to bound, with the said lower edge, an evacuating passage that the gas is constrained to follow under the effect of the means which cause it to circulate.

In a preferred embodiment of this feature, means are provided to adjust the position of the deflecting wall with respect to lower edge of the trickling which extends it lowest.

It will then be seen that, due to the feature which has just been considered, the load losses of the flow of polluted gas are reduced whilst preserving an efficient capturing action.

In order that the invention may be more fully understood, some preferred embodiments of devices according to the invention are described below, purely by way of illustrative but non-limiting example, with reference to the accompanying drawings, in which.

Referring to FIGS. 1 to 16, various embodiments according to the invention will now be described as applied to devices for producing a homogeneous sheet of polluted gas washing liquid.

Figure 1:
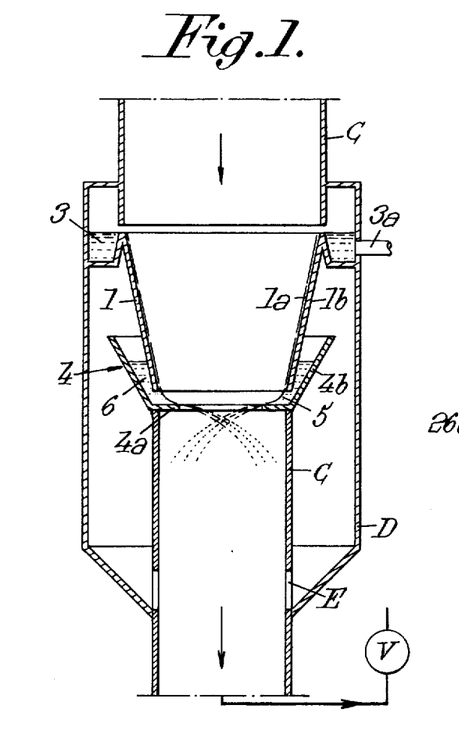
FIG. 1 is a diagrammatic section of one embodiment of a device constructed according to the invention.

The washing device shown in FIG. 1 is suitable for washing a polluted gas constituted by a paint fog in suspension in air.

This device comprises an inclined trickling wall 1 constituted by a frustoconic section with a vertical axis.

This inclined trickling wall 1 has a wet side 1a (inner side) and a dry 1b (outer side).

Means are provided to make a washing liquid, generally constituted by water, trickle over the wet side 1a of this trickling wall 1; these means can be constituted by an overflow gutter 3, of annular shape, arranged at the upper edge of the trickling wall 1, this overflow gutter being supplied with water through a pipe 3a.

Means, such as a suction apparatus V and an assembly of pipes C, are provided to make the polluted gas flow from above to below, on the wet side 1a of the trickling wall 1.

The washing device comprises in addition a complementary wall 4 constituted by:

a lower portion 4a extending transversely beyond the extension of the wet side 1a of the trickling wall 1 and bounding with the lower edge of said trickling wall 1 and a separating slot 5, and an upper portion 4b extending upwardly from the dry side 1b of the trickling wall 1 and bounding with this dry side 1b a reverse volume 6 upwardly open and placed in communication with a zone of the device under suction with respect to the zone situated at the level of the lower edge of the trickling edge 1.

Taking into account the frustoconic shape of the trickling wall 1, the complementary wall 4 has an annular shape and its lower portion 4a can be constituted by a flange of which the plane is perpendicular to the axis of the section of the cone constituting the trickling wall 1, and its upper portion 4b can be constituted by an element of a section of a cone surrounding the trickling wall 1.

The separating slot 5 then has also an annular shape.

As shown in FIG. 1, this complementary wall 4 can be connected to one of the pipes of the assembly of pipes C.

A fluid-tight casing D is advantageously provided around the complementary wall 4 to cause the existence in the reserve volume 6 of the pressure existing below the trickling wall 1, this casing D hence being able to be connected at the level of an opening to the pipe C ending at the suction apparatus V.

Figure 2:
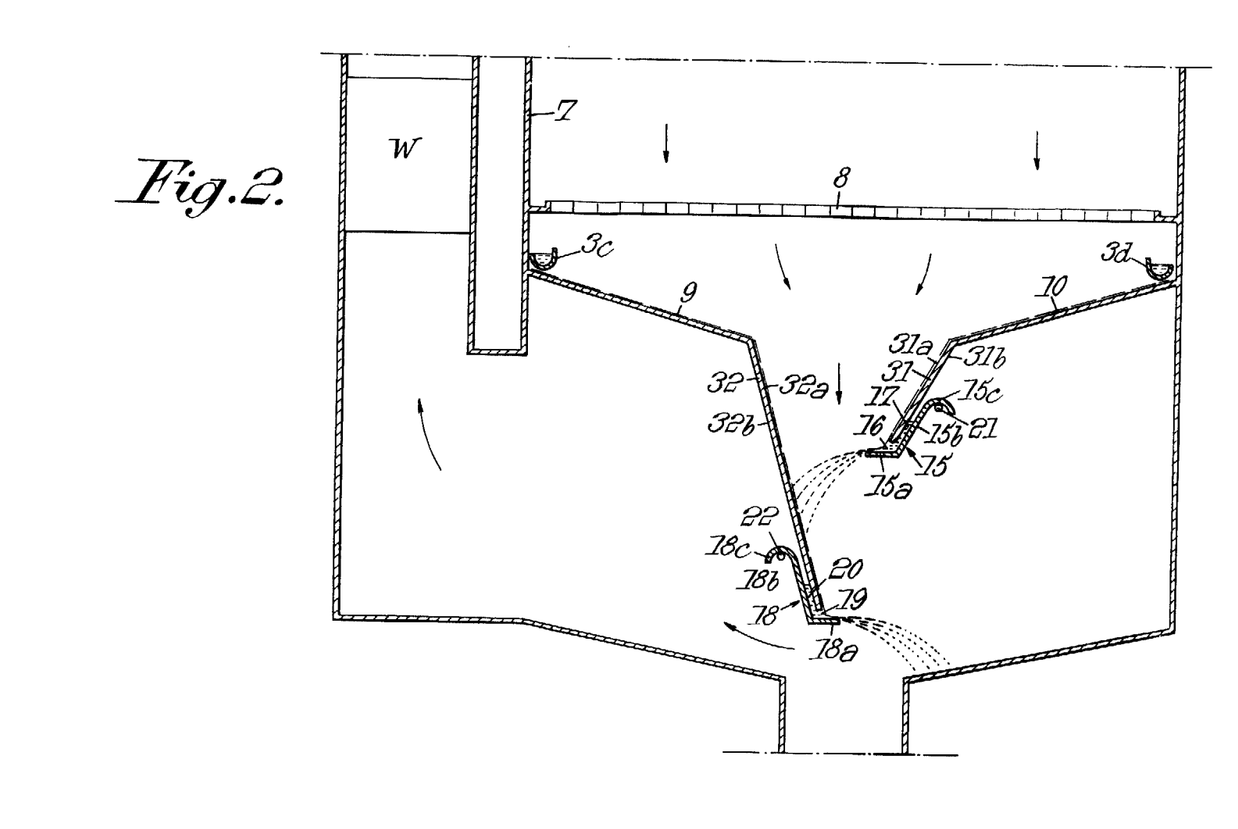
FIG. 2 is a diagrammatic section of a second embodiment of a painting enclosure equipped with a device according to the invention.

In FIG. 2, there is shown a painting enclosure 7 of which the floor 8 is perforated. The air loaded with paint fog passes through this floor 8 and it is directed towards the washing device according to the invention, which hence is situated below the painting enclosure 7.

The means for causing the polluted gas to circulate are constituted by a suction apparatus W which can be arranged laterally with respect to the painting enclosure 7.

The washing device can be advantageously connected to the lower portion of the painting enclosure 7 by two inclined planes 9 and 10 over which the water coming from the overflow gutters 3c and 3d trickles.

Polluted gas hence circulates from above to below in this washing device.

The washing device includes two trickling walls 31 and 32.

The trickling wall 31 is connected to the inclined plane 10 and has a wet side 31a and a dry side 31b, this trickling wall 31 receiving trickling water from the inclined plane 10.

The trickling wall 32 is connected to the inclined plane 9 and has a wet side 32a and a dry side 32b, this trickling wall 32 receiving trickling water from the inclined plane 9.

The two inclined planes 9 and 10 and the two trickling walls 32 and 31 are advantageously arranged substantially symmetrically with respect to the longitudinal plane of the painting enclosure, and the trickling wall 32 descends lower than the trickling wall 31.

Under these conditions, the two trickling walls 31 and 32 are flat and extend over the whole length of the painting enclosure.

Such a washing device comprises in addition a complementary wall 15 arranged below the lower edge of the trickling wall 31 and a complementary wall 18 arranged below the lower edge of the trickling wall 32.

The complementary wall 15 is constituted by:

a lower portion 15a extending transversely beyond the extension of the wet side 31a of the trickling wall 31 and bounding with the lower edge of the said trickling wall 31 a separating slot 16, and an upper portion 15b extending upwardly from the dry side 31b of the trickling wall 31 and bounding with this dry side 31b a reserve capacity 17 upwardly open and placed in communication with a zone of the device under suction with respect to the zone situated at the level of the lower edge of the trickling wall 31.

The complementary wall 18 is constituted by:

a lower portion 18a extending transversely beyond the extension of the wet side 32a of the trickling wall 32 and bounding with the lower edge of the said trickling wall 32 a separating slot 19, and an upper portion 18b extending upwardly from the dry side 32b of the trickling wall 32 and bounding with the dry side 32b a reserve capacity 20 upwardly open and placed in communication with a zone of the device under suction with respect to the zone situated at the level of the lower edge of the trickling wall 32.

Under these conditions, the separating slots 16 and 19 extend parallel to the longitudinal plane of the painting enclosure.

To be able to proceed with the cleaning operations at the level of the complementary walls 15 and 18 (especially cleaning of the reserve capacities 17 and 20), it is advantageous to mount the two complementary walls 15 and 18 on the structure of the washing device by means of hinges 21 and 22 which enable the said complementary walls 15 and 18 to be separated by their pivoting in the direction of the arrows F.

These articulations 21 and 22 are preferably situated towards the upper edge of the complementary walls 15 and 18.

It should be pointed out that it is advantageous to make the upper edge of each complementary wall comprise a rounded extension extending in the opposite direction to the corresponding trickling wall, and downwardly; this extension facilitates, if necessary, the overflow of the water contained in the reserve capacity.

Such an extension is shown at 15c for the complementary wall 15, and at 18c for the complementary wall 18, in FIG. 2.

In any case, and whatever the embodiment, the water which accumulates in the one or more reserve volumes reaches a height which corresponds to the difference between the pressure which exists in the zone situated at the level of the lower edge of the trickling wall and the pressure which exists in the reserve volume concerned.

In practice this reserve capacity is given a height corresponding to this difference in pressure, increased by about 50 percent.

When a tear appears in the sheet of water, the loss of pressure in the zone situated at the level of the lower edge of the trickling wall diminishes since the spraying is locally disturbed; under these conditions, the height of the water in the reserve volume diminishes and a certain volume of water escapes from this reserve volume to reconstitute the sheet of water in line with its tear. The pressure loss then comes back to the normal value that it reached before the tear occurred and the water is then recycled into the reserve volume up to a height corresponding to the normal value of the abovesaid pressure loss.

The operation of the washing device according to the invention is hence of a self-regulating nature.

Figure 3:
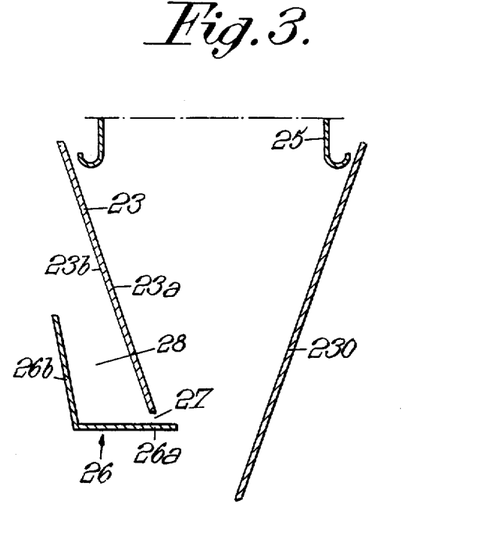
FIGS. 3, 4 and 5 are views in detail on a larger scale, illustrating some variations of the embodiment shown in FIG. 2.
Figure 4:
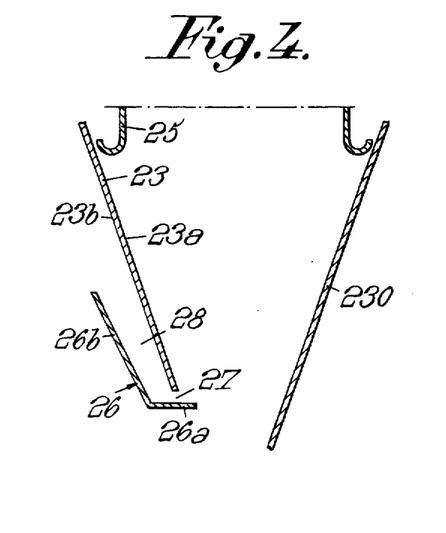
Figure 5:
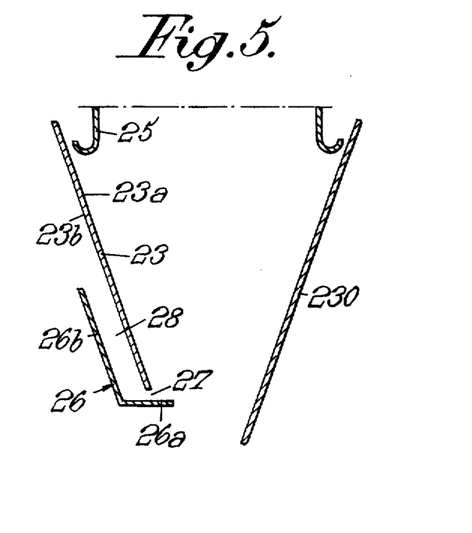

In FIGS. 3, 4 and 5, there are shown various different embodiments of the reserve volume.

In these Figures, it is assumed that the washing device includes a trickling wall 23 having a wet side 23a and a dry side 23b.

This washing device comprises in addition a complementary wall 26 constituted by:

a lower portion 26a extending transversely beyond the extension of the wet side 23a of the trickling wall and bounding with the lower edge of the said trickling wall 23 a separating slot 27, and an upper portion 26b extending upwardly from the dry side 23b of the trickling wall 23 and bounding with this dry side 23b a reserve volume 28 upwardly open and placed in communication with a zone of the device under suction with respect to the zone situated at the level of the lower edge of the trickling wall 23.

An opposite trickling wall 230 is then provided facing the trickling wall 23, this trickling wall 230 extending below the lower edge of the trickling wall 23, the two trickling walls 23 and 230 forming a V-shaped channel.

Means 25 are provided to cause the water to trickle over the trickling wall 23 and over the trickling wall 230.

In FIG. 3, the cross-section, through a horizontal plane, of the reserve volume 28 diminishes from below to above; the flow rate of water restored by this reserve volume 28 hence increases when the pressure loss at the level of the lower edge of the trickling wall 23 diminishes by reason of the appearance of a tear in the sheet of water.

In FIG. 4, the cross-section, in a horizontal plane, of the reserve volume 28 increases from below to above; the flow rate of the water restored by this reserve volume 28 diminishes therefore when the pressure loss at the level at the lower edge of the trickling wall 23 diminishes by reason of the appearance of a tear in the sheet of water.

In FIG. 5, the cross-section, through the horizontal plane, of the reserve volume 28 is constant; the flow rate of water restored by this reserve volume 28 remains constant when the pressure loss at the level of the lower edge of the trickling wall 23 diminishes by reason of the appearance of a tear in the sheet of water.

As regards the orientation of the lower portion of the complementary wall, it should be pointed out that this orientation can be horizontal or upwardly directed, in which case the said lower portion can be flat or curved.

When the washing device is extended over a great length (which is the case when it relates a washing device for a painting enclosure), it can be advantageous to partition the one or more reserve volumes, this arrangement enabling various automatic adjustments according to the various longitudinal cross-sections of the washing device.

There will now be described a complementary feature of the invention, which has the object of stabilizing the water level in the reserve volume.

In fact, it was noted under certain conditions that when the flow rate of the washing water was slight and/or when the speed of the polluted gas was high the water level in the reserve volume became unstable; there was hence a risk of producing, in the midst of the water itself contained in this reserve volume, of a succession of gas bubbles between the surface of the water and the separating slot existing between the lower edge of the trickling wall and the lower portion of the complementary wall.

It will then be appreciated that this succession of gas bubbles constitutes a "chimney" in the midst of the water contained in the reserve and prevents this reserve from providing supplementary water to mend a possible tear in the sheet of water on the trickling wall.

Figure 6:
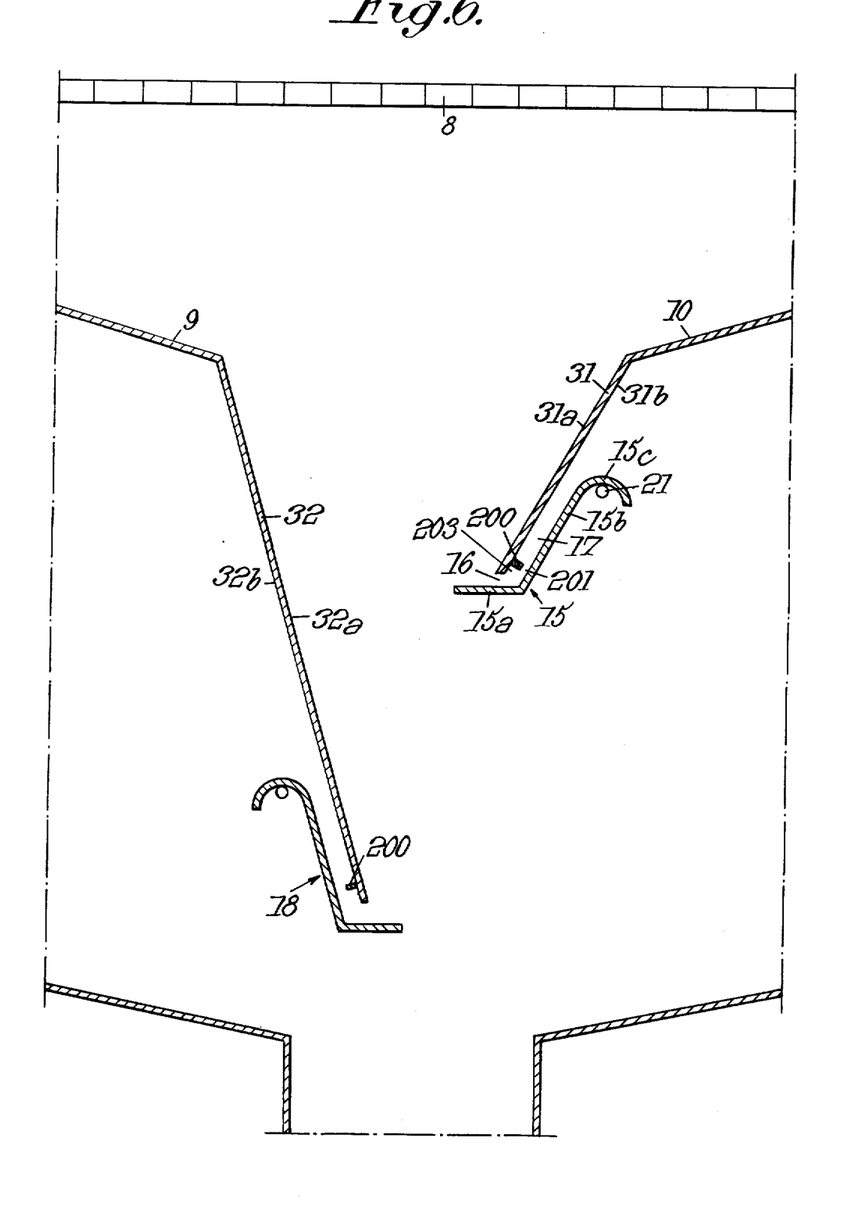
FIG. 6 is a partial diagrammatic section of a painting enclosure equipped with a third embodiment of a device according to the invention.

As seen in FIG. 6, in which the same reference figures denote the same members as in FIG. 2, this complementary feature consists of making the washing device include in addition a transverse wall 200 arranged above the separation slot 16 and extending from the trickling wall 31 towards the complementary wall 15, so as to bound with the said complementary wall 15 a section of passage 201 through which the water contained in the reserve volume 17 can flow.

This transverse wall 200 can be fixed in fluid tight manner on the trickling wall 31.

Figure 7:
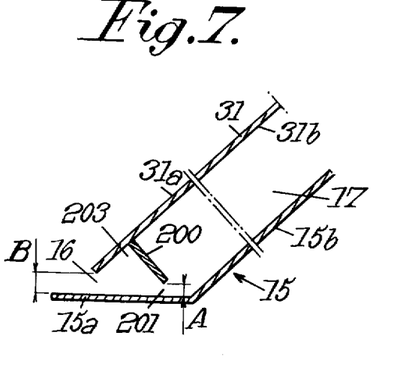
FIGS. 7, 8 and 9 are detailed views, on a larger scale, illustrating certain other embodiments of the device of FIG. 6.
Figure 10:
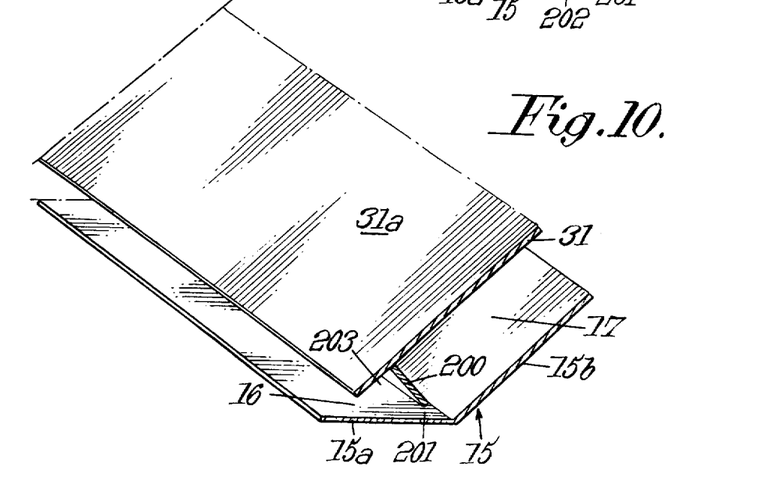
FIG. 10 is a partial perspective view corresponding to the embodiment shown in FIG. 7.

In FIGS. 7 and 10, it is assumed that the transverse wall 200 is fixed on the trickling wall 31 above its lower edge.

Figure 8:
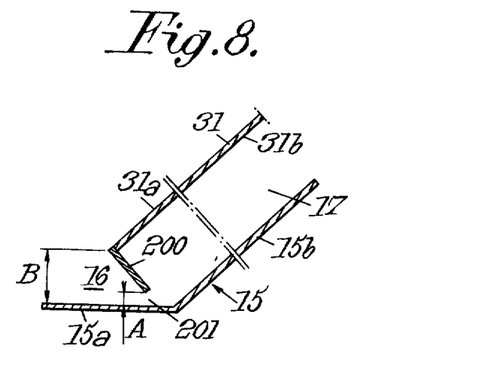

In FIG. 8, it is assumed that the transverse wall 200 is fixed on the trickling wall 31 at the level of its lower edge.

Figure 9:
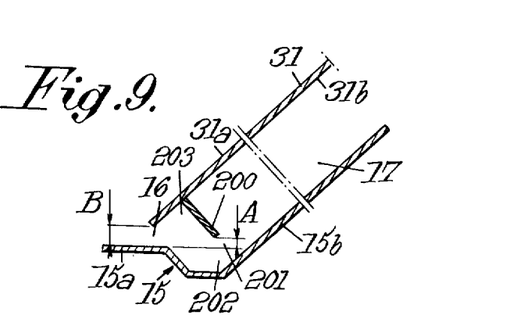

In FIG. 9, it is assumed that the transverse wall 200 is fixed on the trickling wall 31 above its lower edge, and it is assumed that the complementary wall 15 has, below the transverse wall 200, an elongated basin 202 increasing the value of the separation separating the abovesaid transverse wall from the abovesaid complementary wall 15.

In the case of FIGS. 6, 7, 9 and 10, the transverse wall 200 bounds with the trickling wall 31 a dead volume 203 in which the gas bubbles which are formed at the level of the separating slot 16 can be temporarily retained.

In any case and whatever the embodiment adopted, the separation A separating the transverse wall 200 from the lower portion 15a of the complementary wall 15 (FIGS. 7 and 8) or of its horizontal extension (FIG. 9) must be less, or in the limit equal, to the separation B separating the lower edge of the trickling wall 31 from the lower portion 15a of the complementary wall 15, this separation B representing in fact the height of the separating slot 16.

In the washing device constructed according to FIG. 7, the small gas bubbles which are formed at the level of the separating slot 16 are contained in the dead volume 203, and these gas bubbles are accumulated in the said dead volume 203 rather than reascend directly in the water contained in the reserve volume 17.

The gas thus accumulated emerges either through the separating slot 16, which is preferable, or towards the reserve volume 17.

In the washing device constructed according to FIG. 8, the transverse wall 200 shields the water contained in the reserve volume 17 from the turbulence which can be formed between this transverse wall 200 and the lower portion 15a of the complementary wall 15; the small gas bubbles are stopped by the transverse wall 200 and escape easily through the separating slot 16.

In the washing device constructed according to FIG. 9, the same phenomenon is produced as in the washing device constructed according to FIG. 7 but, due to the elongated basin 202, the section of passage 201 under the transverse wall 200 is increased, which reduces the risks of fouling up and obstruction in this portion of the washing device.

There will now be described yet another complementary feature of the invention, which has the object of reducing the pressure losses of the polluted gas flow whilst preserving the efficient capturing effect of the washing water.

Figure 11:
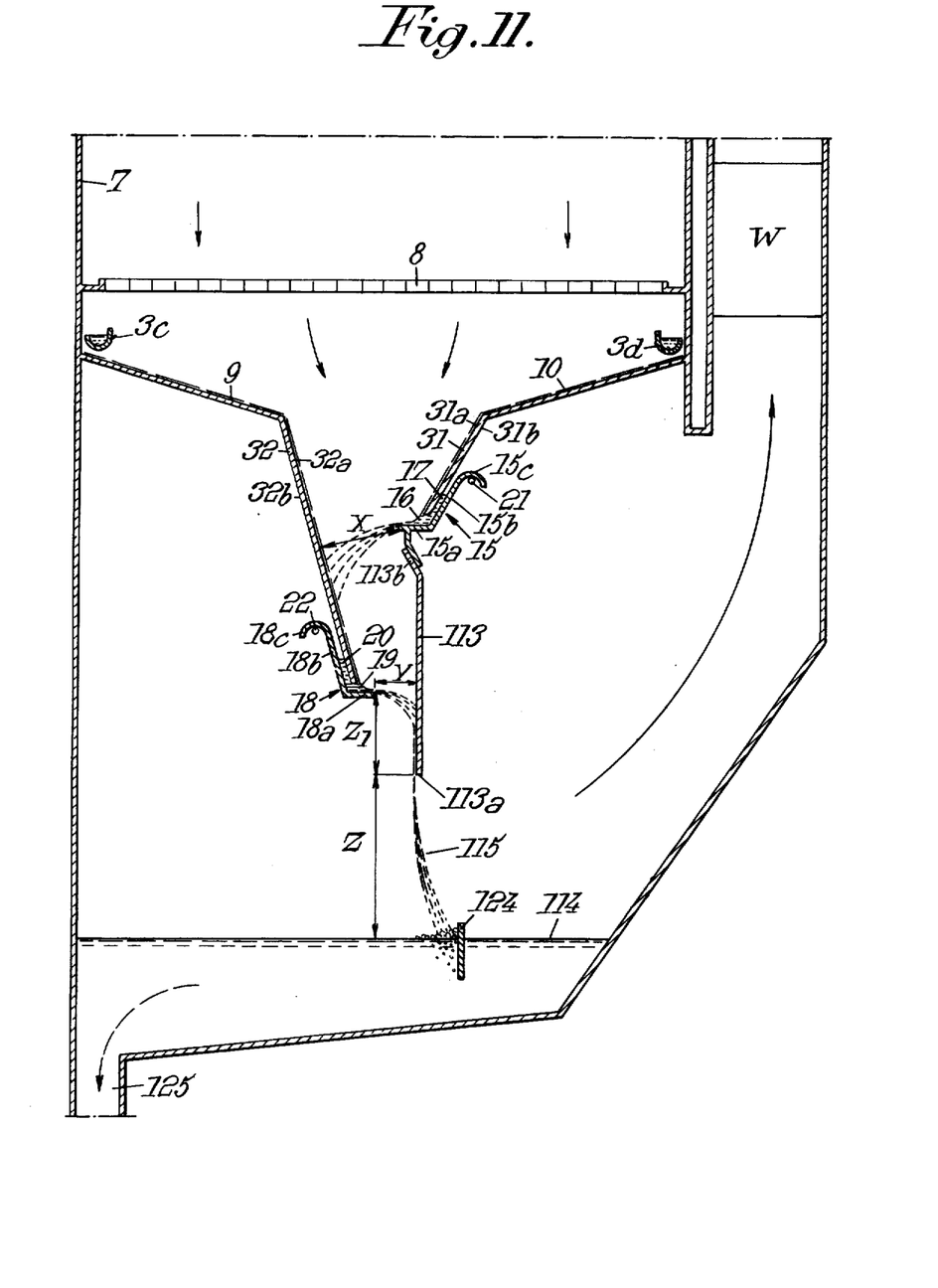
FIG. 11 is a diagrammatic section of a painting enclosure equipped with a device constructed according to a fourth embodiment of the invention.

As seen in FIG. 11, in which the same reference numerals denote the same members as in FIG. 2, this complementary feature consists:

in arranging a deflecting wall 113 facing the lower edge of the trickling wall 32 which is extended lowest, and in arranging a barrier surface 114 below the lower edge 113a of the deflecting wall 113 to bound with the said lower edge 113a an evacuation passage 115 that the gas is obliged to take under the effect of the aspirating device W.

Preferably, the deflecting wall 113 is vertical or substantially vertical.

If necessary, the lower edge 113a of this deflecting wall can be provided with a complementary wall like those equipping the trickling walls.

This trickling wall 113 can be connected to the complementary wall 15 of the trickling wall 31 which is extended most downward, by an upper extension 113 which ends at this complementary wall 15.

The assembly formed by the deflecting wall 113 and its upper extension 113b is preferably arranged to present, for the flow of polluted gas, a convex shape in its upper portion (that is to say facing the trickling wall 32 which is extended most downward), then a concave or flat shape in its lower portion (that is to say towards the lower edge of this trickling wall 32).

As regards the barrier surface 114, it can advantageously be constituted by the free surface of a reserve of water, in which case the stop surface 114 is horizontal.

However, this barrier surface 114 could also be constituted by a wall slightly inclined with respect to the horizontal and on which water would trickle.

Preferably, means are provided so that the position of the deflecting wall 113 can be adjusted with respect to the lower edge of the trickling wall 32 which extends it most downwards.

Figure 12:
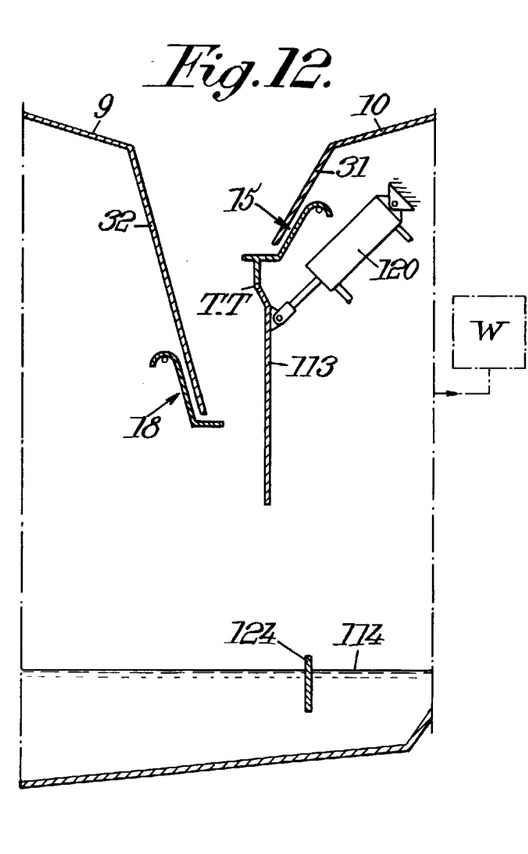
FIGS. 12 and 13 illustrate respectively two details of the embodiment shown in FIG. 11.
Figure 13:
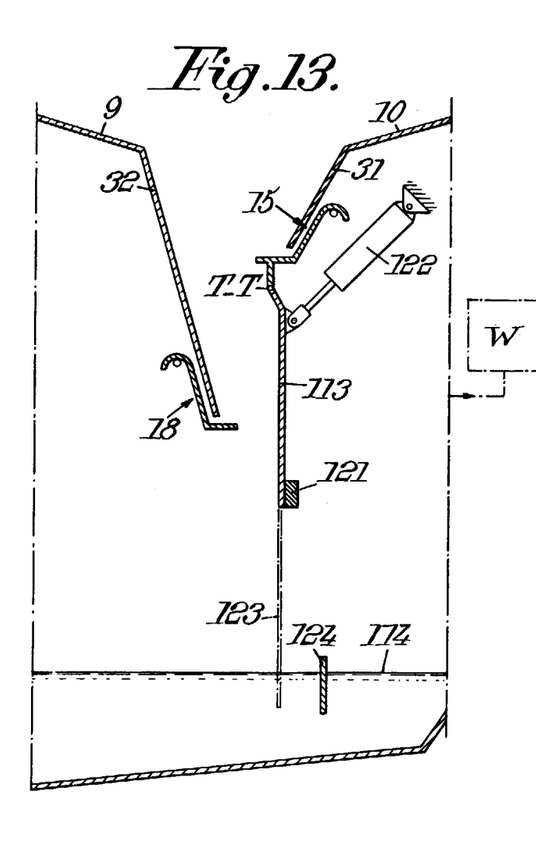

These means are illustrated in FIG. 11, and in FIGS. 12 and 13 in which the same reference numerals denote the same members as in FIG. 11.

In FIG. 11, it is assumed that the deflecting wall 113 is dismountable with respect to its upper extension 113b, due for example to a fixing system (not shown) which can be of the bolt and elongated hole type); under these conditions, adjustment is effected by unlocking and locking this fixing system.

In FIGS. 12 and 13, it is assumed that the deflecting wall 113 was mounted pivotably around an axis TT situated below the lower edge of the trickling wall 31 which extends it most downwards, this axis TT extending parallel to the abovesaid lower edge.

The position of the deflecting wall 113 can then be adjusted by a drive member 120 (FIG. 12).

However, the angular position of the deflecting wall 113 can also be automatically adjusted under the conjugate effects of the sheet of water detaching itself from the most downwardly extending trickling wall 32, of the flow of polluted gas, and of the weight itself of the deflecting wall 113, the value of which weight can be increased in adjustable manner by one or several counterweights 121 (FIG. 13).

In this case, the adjustment of the position of the deflecting wall 113 is automatic and it can be advantageous to provide a damping device to avoid oscillating phenomena.

This damping device can be constituted by a telescopic damper 122 or by a simple blade 123 fast to the deflecting wall 113 and immersed in the water whose free level constitutes the barrier surface 114.

A constructive detail of the washing device according to the invention is more particularly illustrated in FIG. 11, this constructive detail being relative to the case where the barrier surface 114 is constituted by the free surface of a reserve of water; in this case there is produced, below the deflecting wall 113, a fairly intense turbulence which causes foam risking the formation of droplets capable of being drawn towards the aspirating apparatus W.

To overcome this drawback, a separating plate for the droplets 124 is arranged, substantially vertically, a little beyond the passage 115 situated below the deflecting wall 113; this plate 124 projects above the free surface of the reserve of water of the barrier surface 114.

Means 125 are then provided for removing the water in reverse direction to the flow of polluted gas, which enables the flocculent paint to be drawn in the opposite direction to the evacuation chimney 126 ending at the aspirating apparatus W.

The distance X separating the trickling wall 32 which extends most downwards from the complementary wall 15 of the other trickling wall 31, is greater than the distance Y separating the complementary wall 18 of this trickling wall 32 from the deflecting wall 113.

The distance Z separating the barrier surface 114 of the lower edge 113a from the deflecting wall 113, is greater than the abovesaid distance X.

And the dimension $Z_1$ of the portion of the deflecting wall 113 which extends below the level defined by the lower portion 18a of the complementary wall 18 of the most downwardly extended trickling wall 32, is greater than the abovesaid distance Y.

Advantageously, there is given to the parameters X, Y, Z and $Z_1$ the following relative values:
X = 2Y
Z = 2X
$Z_1$ = 2Y.

Finally, with a washing device according to the feature which has just been described, the capture of solid and/or liquid particles (more particularly paint fog) in polluted air is effected:

in a first liquid sheet detaching itself from the lower edge of the most downwardly extended trickling wall 31, in the second liquid sheet detaching itself from the lower edge of the most downwardly extended trickling wall 32, this second liquid sheet having a flow rate greater than that of the first liquid sheet and sweeping over a cross-section less than that swept by the abovesaid first liquid sheet, and in a third almost vertical liquid sheet constituted by the curtain of water falling from the deflecting wall 113.

Figure 14:
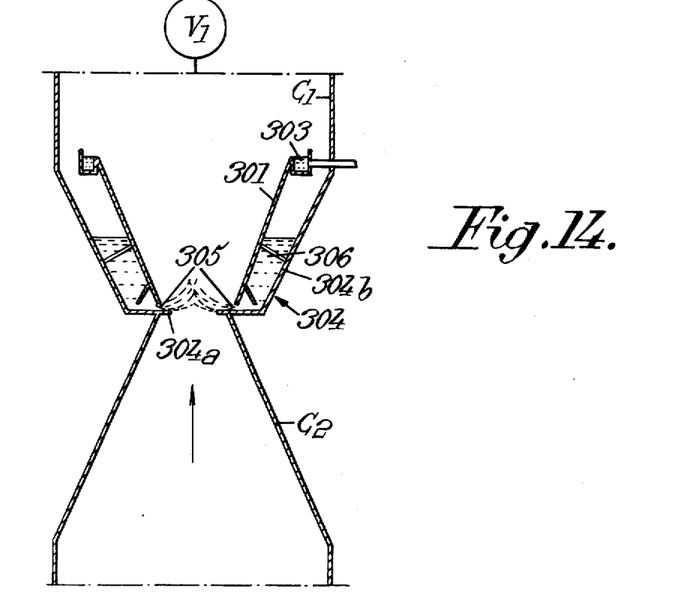
FIG. 14 is a diagrammatic section of a fifth embodiment of a device constructed according to the invention.

The washing device shown in FIG. 14 is close to the washing device shown in FIG. 1, but although in the case of FIG. 1 the circulation of polluted gas is effected from above to below, the circulation of polluted gas is effected, in the case of FIG. 14, from below to above.

This device comprises an inclined trickling wall 301 of frustroconic shape and an overflow gutter 303 to make the water trickle over the said trickling wall 301.

This trickling wall 301 is provided with a complementary wall 304 defining a separating slot 305 and a reserve volume 306.

Means, such as an aspirating apparatus $V_1$ and an assembly of ducts $C_1$ and $C_2$, cause the polluted gas to flow from below to above.

The upper portion 304b of the complementary wall 304 is connected to the upper ducts $C_1$, by means of which there exists in the reserve volume 306 the pressure existing above the trickling wall 301.

The lower portion 304a of the complementary wall 304 is connected to the lower ducts $C_2$, which advantageously forms a convergent member ending at this lower wall 304a.

Figure 15:
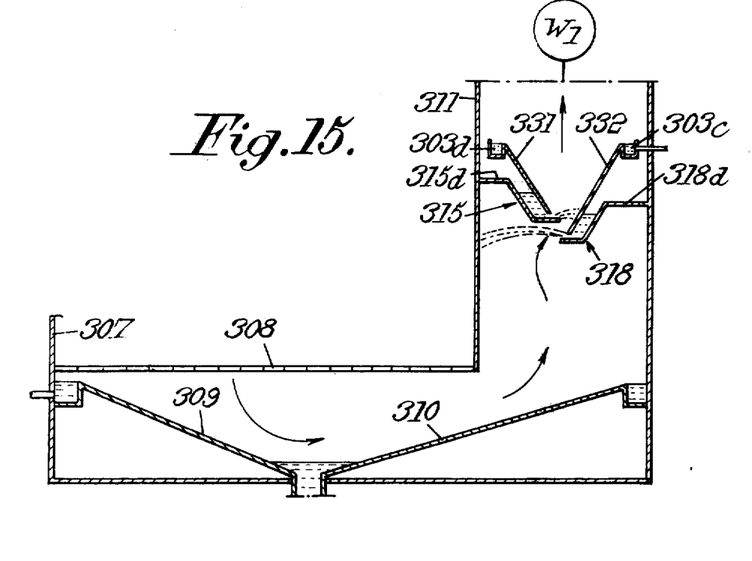
FIG. 15 is a diagrammatic section of a painting enclosure equipped with a device according to a sixth embodiment of the invention.

In FIG. 15, there is shown a painting enclosure which approaches the painting enclosure shown in FIG. 2, but although in the case of FIG. 2, the painting enclosure includes a washing device under its floor, the painting enclosure of FIG. 14 includes a lateral washing device.

In this lateral washing device, the circulation of polluted gas is effected from below to above.

The floor 308 of this painting enclosure 307 is perforated and there are provided arranged below this floor 308 two inclined planes 309 and 310 over which water trickles in the direction of an evacuating gutter.

An aspirating apparatus $W_1$ is arranged laterally and aspirates the polluted gases into a chimney 311 in which the washing device is located.

This washing device comprises two trickling walls 331 and 332 fed respectively by two overflow gutters 303c and 303d and arranged to form a V: one, the trickling wall 332, descends lower than the other, the trickling wall 331.

A complementary wall 315 is arranged below the lower edge of the trickling wall 331, and a complementary wall 318 is arranged below the lower edge of the trickling wall 332, these complementary walls 315 and 318 being connected by elements 315d and 318d to the chimney 311. These elements enable the reserve volumes defined by the abovesaid complementary walls to be placed in communication with the zones under suction.

Figure 16:
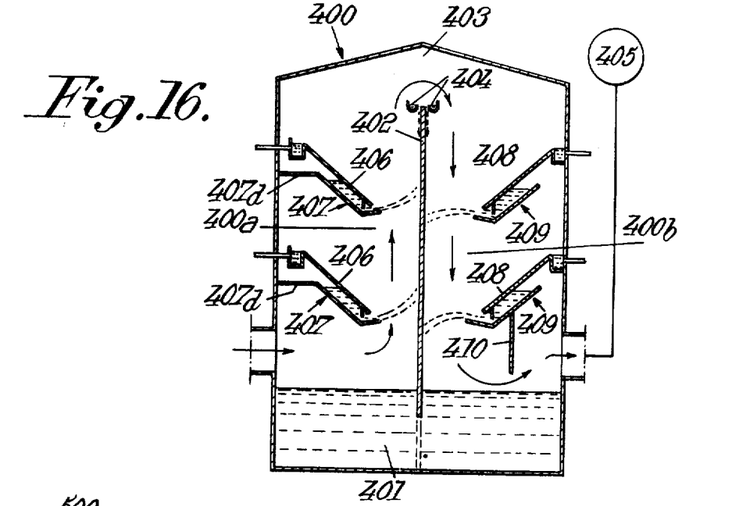
FIG. 16 is a diagrammatic section of a washing installation equipped with a seventh embodiment of a device constructed according to the invention.

The washing device shown in FIG. 16 includes a portion with an ascending current in which the polluted gas flows in reverse direction (from below to above) with respect to the trickling of the water, and a portion with a descending current in which the polluted gas flows in the same direction (from above to below) with respect to the trickling water.

The device is constituted by an enclosure 400 of which the bottom contains a reserve of water 401, this enclosure 400 being separated by a central partition 402 allowing an upward communication 403 to subsist, and defining a portion with an ascending current 400a and a portion with a descending current 400b.

Means 404 bring water to the upper portion of the central partition 402 to cause trickling over the two surfaces of the said central partition 402.

The polluted gas is admitted towards the bottom of the portion with the ascending current 400a and it is evacuated through an aspirating apparatus 405 towards the bottom of the portion with a descending current 400b.

The ascending current portion 400a comprises several (for example two) trickling walls 406, arranged one above the other so that their lower edge is on the side of the central partition 402, each trickling wall 406 being provided with its complementary wall 407.

The descending current portion 400b comprises several (for example two) trickling walls 408, arranged one above the other so that their lower edge is on the side of the central partition 402, each trickling wall 408 being provided with its complementary wall 409.

Overflow gutters 4b supply each trickling wall 406, 408.

In the ascending current portion 400a, the complementary walls 407 are connected by elements 407d to a wall of the enclosure 400. These elements enable the reserve volumes defined by the abovesaid complementary walls to be placed in communication with the zones under suction.

In the descending current portion 400b, there is advantageously provided a vertical wall 410 leaving the complementary wall 409 of the trickling wall 408 which is situated lowest and obliges the gas to lick the surface of the reserve of water 401.

This vertical wall 410 contributes also to causing suction to prevail in the reserve volume defined by the complementary wall 409 of this trickling wall 408 which is situated lowest.

Figure 17:
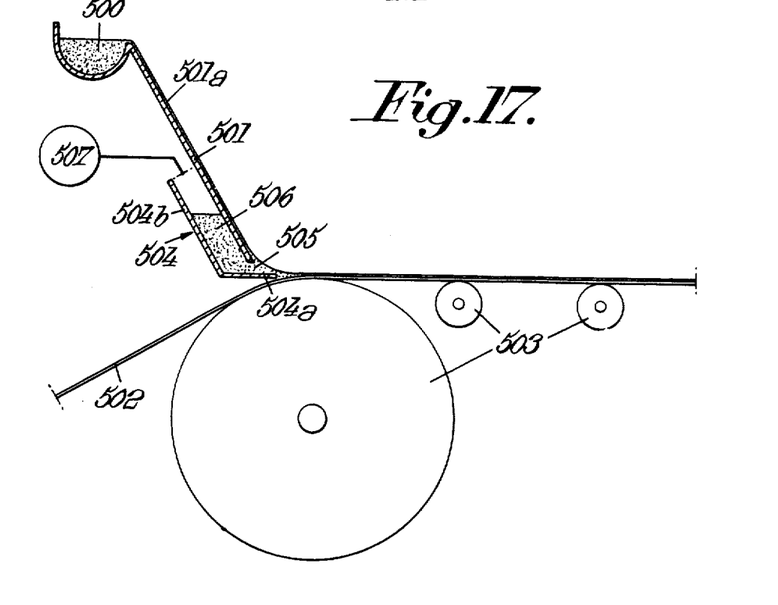
FIG. 17 is a diagrammatic section of a coating machine provided with a device constructed according to an eighth embodiment of the invention.

Referring now to FIG. 17, there will be described an embodiment of the invention assumed applied to devices to generate a homogeneous sheet of coating product in a coating machine.

The coating machine includes a reserve of coating product 500 which causes the trickling of this product over the wet side 501a of an inclined trickling wall 501.

The lower edge of this trickling wall 501 ends above a fabric 502 to be coated borne by drums 503 (or by an endless band).

The coating machine includes in addition a complementary wall 504 constituted by, a lower portion 504a extending transversely beyond the extension of the wet side 501a of the trickling wall 501 and bounding with the lower edge of the said trickling wall 501 a separating slot 505, and an upper portion 504b extending upwardly on the dry side 501b of the trickling wall 501 and bounding with this dry side 501b a reserve volume 506 upwardly open and placed in communication, due to means 507, with a zone of the device under suction with respect to the zone situated at the level of the lower edge of the trickling wall 501.

In the case of a washing device, the invention introduces a certain number of advantages amongst which may be mentioned those summarized by the following points:

there are eliminated to a considerable extent the risks of tearing the sheet of water and there is hence obtained a trapping efficiency greater than that of previously known washing devices;

there is obtained an automatic operation of the washing device due to the self-regulating effect obtained by the accumulation and the restoring of water into the reserve volume;

when for reasons of economy the distribution of water is stopped (which can be considered especially in the neighborhood of the outlet end of a painting enclosure), the pressure loss in the circuit of the polluted gases is reduced by reason of the aerodynamic effect of slot obtained by the complementary wall;

due to the presence of the transverse wall, it is possible to obtain satisfactory operation of the washing device even for very small flow rates of water, in fact even in the local absence of water on the trickling wall;

due to the rational use of the flow of liquid and its concentration in the second liquid sheet, there is obtained a constant trapping efficiency;

moreover, due to the good spraying of the assembly of walls constituting the washing device, the operations of cleaning are simplified.

In other fields of application, the invention enables the obtaining of a homogeneous sheet of flowing substance, regular and free from any tearing; in the field of the application of a coating, these advantages enable a coated fabric of better quality to be obtained.

We claim:

1. A device for producing a homogeneous sheet of liquid for washing polluted gas, the device comprising a liquid supply; an inclined first wall; means for causing liquid from said liquid supply to trickle down on one side of said first wall to form a sheet of liquid thereon; reserve means defining a reserve liquid volume, said reserve means comprising a second wall, said second wall being spaced from the other side of said first wall and having an upper portion facing said other side of said first wall to define a reserve liquid tank, and a lower portion extending from said upper portion and spaced below the lower edge of said first wall and cooperating with the lower edge of said first wall to define a slot, said lower portion extending transversely beyond the lower edge of said first wall; means for causing a stream of polluted gas to flow over said one side of said first wall so that said liquid will wash said gas; and means for placing the top surface of said reserve liquid volume in said reserve liquid tank in communication with a zone of the device situated downstream of the lower edge of said first wall with respect to the flow of polluted gas, such that, in operation, the lowered pressure induced by said stream is communicated to said reserve liquid tank and causes suction of liquid into the reserve tank through said slot, the liquid in the reserve tank being available to compensate for streaking in said sheet of liquid.

2. A device according to claim 1, wherein said first wall is frustoconical, the axis thereof being vertical, said second wall being annular.

3. A device according to claim 1, wherein the lower portion of the second wall is horizontal.

4. A device according to claim 1, wherein the lower portion of the second wall is directed upwardly.

5. A device according to claim 1, wherein the upper edge of the second wall comprises a rounded extension projecting downwardly and in the opposite direction from the associated first wall.

6. A device according to claim 1, including a transverse wall arranged above said slot and projecting from the first wall toward the associated second wall, so as to define in cooperation with such second wall a passage through which liquid in the reserve tank can flow.

7. A device according to claim 6, wherein the transverse wall cooperates with the associated second wall to define a dead volume in which gaseous bubbles formed at the level of the associated slot can be temporarily retained.

8. A device according to claim 6, wherein the transverse wall is fixed to the associated first wall.

9. A device according to claim 8, wherein the transverse wall is fixed in sealing tight fashion to the associated first wall.

10. A device according to claim 6, wherein the transverse wall is fixed to the associated first wall above its lower edge.

11. A device according to claim 6, wherein the transverse wall is fixed to the associated first wall at the level of its lower edge.

12. A device according to claim 6, wherein the space between the transverse wall and the lower portion of the associated second wall is not greater than the space between the lower edge of the associated first wall and the lower portion of such second wall.

13. A device according to claim 1, comprising two of said first walls one of which extends below the other, and two of said second walls each associated with one of said first walls.

14. A device according to claim 13, wherein said first walls are arranged with their said one sides facing one another, a deflecting wall facing the lower edge of that first wall which extends below the other first wall, and a barrier surface being arranged below the lower edge of the deflecting wall to define, in cooperation with such lower edge, a gas discharge passage.

15. A device according to claim 14, wherein means are provided for adjusting the position of the deflecting wall with respect to the lower edge of that first wall which extends below the other first wall.

16. A device according to claim 15, wherein the deflecting wall is pivotally mounted and is adjustable by means of a drive member.

17. A device according to claim 15, wherein the deflecting wall is pivotally mounted and is adjustable by the combined action of the liquid impinging thereupon, of the polluted gas flow, and of the weight of the deflecting wall itself.

18. A device according to claim 17, including a damping device to restrain oscillation of the deflecting wall.

19. A device according to claim 14, wherein the deflecting wall is substantially vertical.

20. A device according to claim 14, wherein the deflecting wall is connected to the second wall associated with said other first wall, by an upper extension which terminates at such second wall, such upper extension being convex towards polluted gas flow and the deflecting wall being other than convex in such direction.

21. A device according to claim 14, wherein the barrier surface is constituted by the surface of a reservoir of liquid.

22. A device according to claim 21, wherein a separating plate for droplets of liquid extends substantially vertically, beyond said gas discharge and projects above the surface of the liquid of said reservoir, means being provided for removal of the washing liquid in reverse direction to the flow of polluted gas.

23. A device according to claim 14, wherein the distance $X$ between that first wall which extends below the other first wall, and the second wall associated with the other first wall, is greater than the distance $Y$ between the second wall associated with that first wall which extends below the other first wall, and the deflecting wall; the distance $Z$ between the barrier surface and the lower edge of the deflecting wall is greater than said distance $X$; and the dimension $Z_1$ of the portion of the deflecting wall which extends below the second wall associated with that first wall which extends below the other first wall, is greater than the said distance $Y$.

24. A device according to claim 23, wherein the parameters $X$, $Y$, $Z$ and $Z_1$ have the following relative values:

$X = 2Y$, $Z = 2X$, $Z_1 = 2Y$.

25. Device for producing a homogeneous sheet of liquid for washing polluted gas, the device comprising an inclined first wall, for trickling said liquid thereon, means for causing liquid to trickle down one side of said first wall to form a sheet of liquid thereon, a second wall complementary with said first wall and having an upper portion facing the other side of the first wall and a lower portion cooperating with the lower edge of said first wall to define a slot, the upper portion of the second wall cooperating with said other side of the first wall to define a reserve liquid tank which opens upwardly to communicate with a first chamber, and means for maintaining said first chamber at a lower pressure than a second chamber containing the lower edge of said one side of the first wall, such that, in operation, liquid flows from the reserve tank to compensate for streaking in said sheet of liquid, and means for causing a stream of polluted gas to flow over said one side of the first wall, to be washed by said liquid, including a transverse wall arranged above said slot and extending from the first wall towards the second wall, so as to form with the said first wall a section of passage through which the liquid contained in the reserve tank can flow, wherein the transverse wall is fixed on the first wall above the lower edge of said first wall, and the second wall has an elongated basin below the transverse wall.

26. Device for producing a homogeneous sheet of liquid for washing polluted gas, the device comprising an inclined first wall, for trickling said liquid thereon, means for causing liquid to trickle down one side of said first wall to form a sheet of liquid thereon, a second wall complementary with said first wall and having an upper portion facing the other side of the first wall and a lower portion cooperating with the lower edge of said first wall to define a slot, the upper portion of the second wall cooperating with said other side of the first wall to define a reserve liquid tank which opens upwardly to communicate with a first chamber, and means for maintaining said first chamber at a lower pressure than a second chamber containing the lower edge of said one side of the first wall, such that, in operation, liquid flows from the reserve tank to compensate for streaking in said sheet of liquid, and means for causing a stream of polluted gas to flow over said one side of the first wall to be washed by said liquid, the second wall being mounted on the device by means of an articulation which enables said second wall to be moved relative to said first wall so that the distance between said first and second walls can be changed.

27. Device according to calim 26, wherein the articulation of the second wall is situated towards the upper edge of the second wall.

* * * * *